UNITED STATES PATENT OFFICE.

WM. E. LOCKWOOD, OF PHILADELPHIA, PENNSYLVANIA, ASSIGNEE, BY MESNE ASSIGNMENTS, OF WALTER HUNT.

IMPROVEMENT IN SHIRT-COLLARS.

Specification forming part of Letters Patent No. 11,376, dated July 25, 1854; Reissue No. 1,927, dated April 4, 1865.

DIVISION D.

*To all whom it may concern:*

Be it known that I, WILLIAM E. LOCKWOOD, of Philadelphia, Pennsylvania, am the owner of certain Letters Patent for an Improvement in Shirt-Collars, granted to WALTER HUNT on the 25th day of July, 1854; that I deem the said patent inoperative and invalid by reason of a defective specification; and I do hereby declare that the following is a full, clear, and exact description of that part of the said invention which consists of a shirt-collar made of a fabric composed of paper and muslin, or an equivalent fabric having a smooth white surface covered with a transparent varnish, for the purpose specified.

The said WALTER HUNT made shirt-collars of white paper, strengthened and stiffened by the interposition of muslin secured to two sheets of the paper. The fabric thus composed was subsequently polished by calendering-rolls, or by other suitable means, the collars to be subsequently shaped, if desired, by dies or formers applied, under pressure, to give them the shape of the wearer's neck. The collar thus formed was provided with the requisite button-holes, after which it was covered with a thin coating of transparent colorless water-proof varnish, for the purpose of protecting it from the effects of moisture, and also of preserving it from being soiled. The varnish which the said WALTER HUNT preferred was composed of bleached shellac, it being transparent, colorless, and capable of resisting humidity longer than any other varnish which he, the said HUNT, had tried. The varnish may be applied to the fabric either in the sheet or after the collar is made, as may be found preferable.

It is evident that the invention is adapted to shirt-bosoms, wrist-bands, &c.

I claim as the invention of the said WALTER HUNT, and as a new manufacture—

A shirt-collar made of a fabric composed of paper and muslin, or an equivalent fabric, having a smooth white surface coated with transparent varnish, for the purpose specified.

In testimony whereof I have signed my name to this specification before two subscribing witnesses.

WILLIAM E. LOCKWOOD.

Witnesses:
HENRY HOWSON,
JOHN WHITE.